United States Patent [19]
LeBlanc et al.

[11] Patent Number: 5,135,024
[45] Date of Patent: Aug. 4, 1992

[54] ROLL OVER PRESSURE RELIEF VALVE

[75] Inventors: Leo J. LeBlanc, Bloomfield Hills; Bruce R. Johnson, Muskegon, both of Mich.

[73] Assignee: EBW, Inc., Muskegon, Mich.

[21] Appl. No.: 766,847

[22] Filed: Sep. 27, 1991

[51] Int. Cl.$^5$ ............................................. F16K 15/02
[52] U.S. Cl. .............................. 137/529; 137/543.17; 220/203
[58] Field of Search ............... 220/203, 209; 138/30; 137/529, 540, 543.17

[56] References Cited

U.S. PATENT DOCUMENTS 4,768,675 9/1988 Coleman ........................... 220/203

OTHER PUBLICATIONS

"Round Manhole With Hatch" Sales Brochure, Liquip Sales Pty., Ltd. pp. 3/1–3/2, 1983.
Oil Equipment Fittings Catalog No. 89 Brochure, Clay and Bailey Mfg. Co. p. 49 (Undated).
Custom Fabrication Brochure For Manholes and Vents, Tiona Betts, Inc. Warren, Pa. (Undated).
NFPA Compliance Manholes, Knappco, Kansas City, Mo. p. 13 (Undated).
PPV Pressure Vacuum Vent For MC306 Tank Vehicles, Tiona Betts, Inc. Warren, Pa. (Undated).

*Primary Examiner*—Robert G. Nilson
*Attorney, Agent, or Firm*—Basile and Hanlon

[57] ABSTRACT

A pressure relief or rollover valve is utilized on the tank of a fuel delivery truck to vent or relieve an abnormal internal pressure within the tank, such as that generated by an accidental deformation of the tank wall, while preventing spillage of fuel during the venting. A tubular valve housing is mounted in the top of the tank with a cover at the exterior of the tank releasably locked in sealed engagement with the upper end of a passage through the housing which opens at its lower end into the tank interior. A valve plate within the housing is biased downwardly to a valve closed position against an upwardly facing valve seat in the passage by springs engaged between the closed cover and the valve plate. A flexible bladder is sealed to the bottom of the cover to define an air chamber sealed from the passage, and openings through the cover vent this air chamber to atmosphere. A shield plate rests on the top of the cover to overlie the vent openings.

7 Claims, 1 Drawing Sheet

ROLL OVER PRESSURE RELIEF VALVE

BACKGROUND OF THE INVENTION

The present invention is directed to a pressure relief valve utilized particularly on fuel delivery tank trucks to relieve the internal pressure developed within the tank in the event of a rollover or other accident in which the tank wall may be deformed in a manner reducing its internal volume.

When a fuel delivery truck is involved in an accident, spillage of fuel from its tanks normally results in a massive fire. In severe accidents, rupture or puncture of one or more of the storage compartments of the tank cannot be avoided. However, in those somewhat less severe accidents where the tank wall is not punctured, but is deformed in a manner decreasing its internal volume, rupture of the tank wall by the increased internal pressure can be avoided by venting the interior of the tank to relieve the pressure. Relief valves for accomplishing this purpose have been employed in the prior art, however, the prior art valves are so constructed that in venting the tank to relieve the internal pressure, a certain quantity of fuel is also vented and spilled. Presently proposed regulations will require that vent valves of this type operate in a manner such that no fuel at all is spilled during the venting operation.

The present invention is directed to a rollover or pressure relief valve which will meet this last requirement.

SUMMARY OF THE INVENTION

A relief valve embodying the present invention includes a housing which may take the form of a relatively short length of pipe having a radially outwardly projecting annular flange extending around its exterior to constitute a mounting flange and an internal radially inwardly projecting annular flange in the interior of the pipe which constitutes a valve seat. The housing is intended to be mounted in the top wall of a tank with its axis extending vertically with the lower end of the housing opening into the interior of the tank and its upper opening at the exterior of the tank.

A valve plate is loosely received within the interior of the pipe above the valve seat and a cover is removably sealed to the upper end of the housing. Compression springs engaged between the bottom of the cover and the top of the valve plate resiliently bias the valve plate downwardly into a valve closed position in which the plate is seated upon the valve seat, blocking flow in either direction past the valve seat. If the pressure at the lower end of the housing exceeds the biasing action of the springs, the valve plate is lifted upwardly clear of the seat to permit fluid to flow upwardly in the housing past the valve seat and around the edges of the valve plate into the space between the top of the valve plate and the cover.

A bladder of flexible fuel impervious material and of a generally bag-shaped configuration is sealed around its mouth to the bottom side of the cover to enclose an air chamber at the bottom of the cover which is sealed by the bladder from the remainder of the interior of the housing. Vent openings are formed through the cover to open into the bladder defined air chamber so that if the bladder is collapsed, as by an increase in pressure within the housing, the air is vented from the bladder through the vent openings to atmosphere. A vent shield in the form of a flat plate lies against the top surface of the cover to normallly overlie the vent openings to prevent dirt and other particulate material from filling the interior of the bladder.

Other objects and features of the invention will become apparent by reference to the following specification and to the drawings.

IN THE DRAWINGS

FIG. 1 is a cross-sectional view of a rollover relief valve embodying the present invention taken on a vertical plane containing the central axis of the valve; and FIG. 2 is a top plan view of the valve of FIG. 1.

DETAILED DESCRIPTION OF THE PREFERRED EMBODIMENTS

Figure 1:
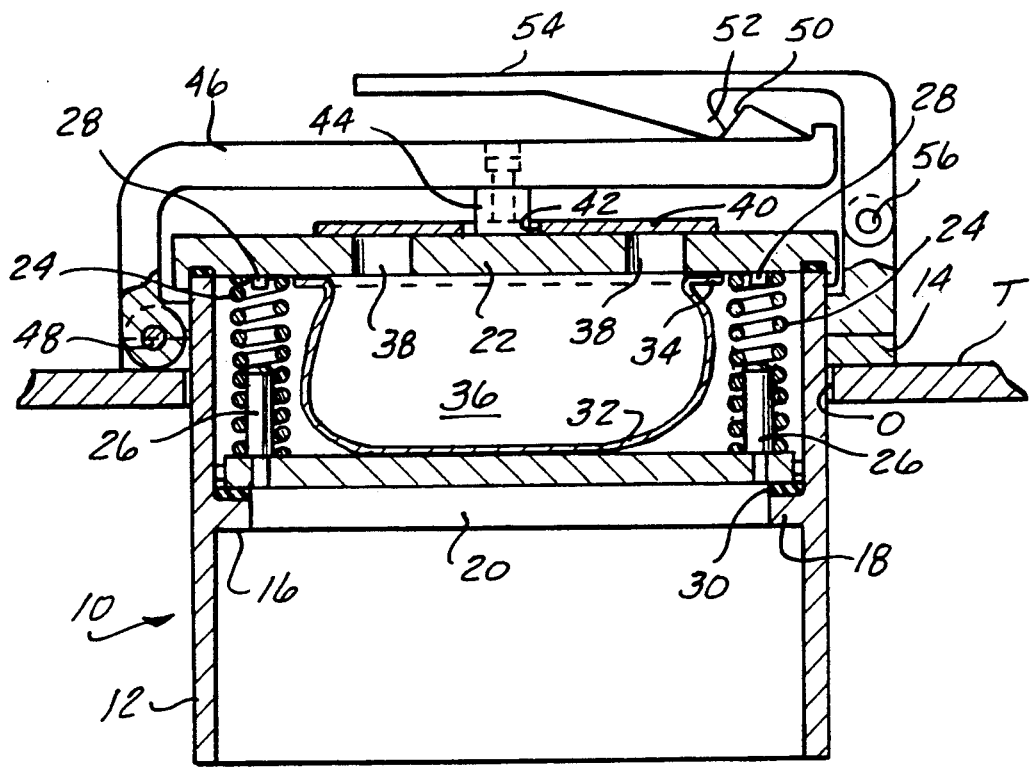

A rollover relief valve in accordance with the present invention includes a housing designated generally 10 having an open-ended hollow cylindrical main portion 12, an annular mounting flange 14 fixedly secured to and projecting outwardly from cylindrical portion 12 and a second annular flange 16 projecting radially inwardly from the inner wall of main portion 12 to form an upwardly facing annular valve seat 18 within the interior of body 12.

A circular valve plate 20 is loosely received within body 12 above valve seat 18. A cover 22 closes the upper end of the central passage through body 12, and valve plate 20 is resiliently biased downwardly against valve seat 18 by a plurality of compression springs 24 engaged beneath the bottom side of cover 22 and the upper side of valve plate 20. Spring guide pins 26 are fixedly mounted upon valve plate 20 and project upwardly from the valve plate into the coils of the springs 24. Similar guide pins, such as 28, may be fixedly mounted upon the bottom of cover 22 to be received within the coils of springs 24. Valve seat 18 may be provided with a resilient seal such as 30 to assure a fluid tight seal which prevents flow of any fluid past valve seat 18 when valve plate 20 is in the seated valve closed position shown in FIG. 1.

A bag-shaped bladder 32 of a flexible fuel impervious material is sealed around its mouth to the bottom side of cover 22 as by a sealing ring 34 secured by screws, not shown, to cover 22. Bladder 32 defines and encloses an air chamber 36 at the bottom side of cover 22 which is sealed from the remainder of the interior of housing 10. Vent openings 38 through cover 22 extend from air chamber 36 to open at the top of the cover. A vent shield 40 which consists simply of an annular ring of sheet metal rests upon the top of cover 22 in overlying relationship with the vent openings 38. The central opening 42 through vent shield 40 loosely surrounds a post 44 fixedly secured to and projecting upwardly from cover 22, post 44 being employed to couple cover 22 as by a screw, not shown, to a locking bar 46 pivotally mounted at one end on housing 10 as at 48. Vent shield 40 is not intended to seal vent openings 38, but instead is intended simply to prevent dirt and other debris from falling into the interior of bladder 32 via the vent openings. The shield simply rests by gravity on the top of cover 22 and will be lifted clear of cover 22 is the pressure in air chamber 36 exceeds atmospheric pressure by a reasonable amount.

For reasons which will become apparent, the biasing force exerted by springs 24 holding valve plate 20 in the valve closed position should be a substantial force of a magnitude such that opening of the valve by lifting plate 20 upwardly clear of seat 18 will occur only when the pressure applied to the bottom of valve plate 20 is a substantial percentage of the pressure which would cause a rupture of the wall of a tank in which the valve is mounted. This requirement in turn requires that a substantial force must be applied to move cover 22 to its closed position.

In the form of valve shown in the drawing, the pivoted locking bar 46 which is coupled to cover 22 is formed with a cam surface 50 engaged by a second cam surface 52 formed on a locking lever 54 pivotally mounted upon housing 10 as by pivot 56. The geometry of the locking bar—locking lever is such as to achieve a substantial mechanical advantage urging cover 22 to its closed position as locking lever 54 is pivoted downwardly toward the locked position shown in FIG. 1. When in the locked position, the line of action between the cam surfaces 50, 52 lies along a line which is slightly over center with respect to pivot 56 so that the upward force exerted by springs 24 on cover 22 and transmitted by post 44 to lock bar 46 acts in a direction urging locking lever 54 to pivot downwardly from the position shown in FIG. 1.

Figure 2:
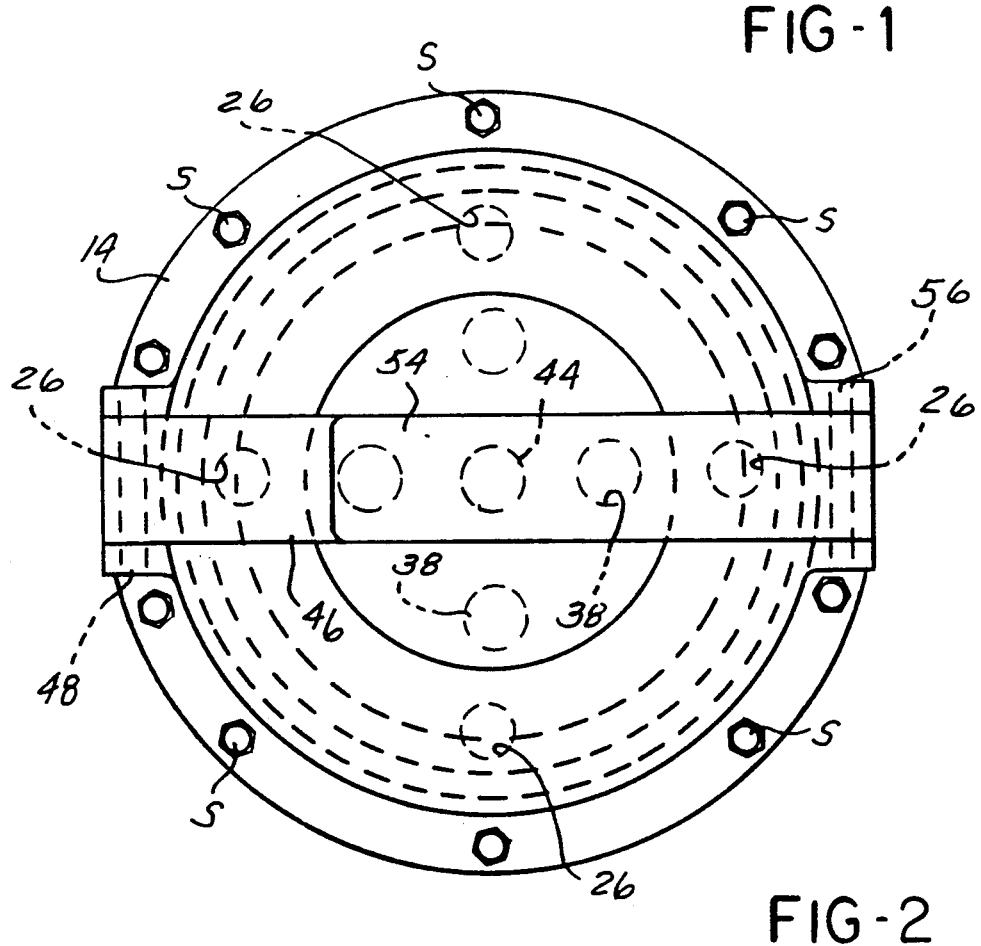

The valve is mounted in the top wall T of the tank to project downwardly through an opening O in the tank top. Screws S (FIG. 2) passing through mounting flange 14 fixedly and sealingly secure the housing 10 in position upon the tank top T. When so mounted, the lower end of the central passage through housing 10 opens into the interior of the tank while the upper end of housing 10 is located at the exterior of the tank and normally closed by cover 22.

In the event of an accident or rollover in which the wall of the tank might be dented or deformed inwardly in a manner which decreases its internal volume, pressure in the headspace of the tank rises in proportion to the decrease in volume. The biasing force exerted by the springs 24 holding the valve plate 20 in the valve closed position of FIG. 1 will be sufficient to maintain the valve closed during the initial stages of compression of the fuel vapor in the tank headspace. As the pressure in the reducing volume of the headspace increases, an increasing resistance to tank deformation will occur. The fuel vapor in the headspace of the tank is compressible and as long as the tank deformation induced decrease in internal volume of the tank does not exceed the original headspace volume, the compression of the fuel vapor acts as a resilient cushioning force. The liquid fuel, however, is incompressible and as the internal volume of the tank is continuously decreased, eventually the cushioning effect or resiliency decreases as the vapor pressure rises. It is at this stage that valve plate 20 is unseated to allow fluid to flow from the interior of the tank upwardly past valve plate 20 into the space between the valve plate and cover 22. An increase in pressure in this last region will collapse the flexible bladder 32, however, liquid fuel cannot flow through the bladder to pass outwardly through vent openings 38.

Because the opening of the valve is delayed by the relatively stiff compression springs 24 holding valve plate 20 in the closed position, at the time the valve plate is opened, the volume of the vapor in the tank headspace has been reduced to a very small volume, hence opening of the valve 20 may permit the headspace volume to be increased by a factor of two or more, thus achieving a reduction in pressure within the tank to one-half or less of the headspace pressure prior to the opening of the valve. Any substantial reduction of pressure within the tank will enable the springs 24 to drive valve plate 20 back to its closed position.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

We claim:

1. A relief valve for relieving an abnormal pressure surge within a liquid containing tank, said valve comprising an open ended tubular housing adapted to be mounted in a vertical position in the top of said tank and having a flow passage extending axially therethrough opening at its lower end into the interior of said tank and having its upper end opening at the exterior of said tank, means defining an upwardly facing annular valve seat in said passage intermediate the ends thereof, a valve plate received in said passage above said valve seat for vertical movement between a valve closed position in sealing engagement with said seat blocking flow of fluid past said seat, and a valve open position spaced above said valve seat accommodating flow of fluid upwardly in said passage past said seat and valve plate, a cover sealingly closing the upper end of said passage, spring means engaged between said cover and said valve plate resiliently biasing said plate toward said valve closed position, a bag-like bladder of flexible liquid tight material having a mouth portion sealed to the bottom of said cover to enclose an air chamber within said housing at the bottom of said cover, and vent means for venting air from said chamber to the atmosphere.

2. The invention defined in claim 1 wherein said vent means comprises means defining a plurality of vent openings through said cover opening into said air chamber.

3. The invention defined in claim 2 further comprising a vent shield plate resting upon the top of said cover in overlying relationship with said vent openings.

4. The invention defined in claim 1 further comprising releasable locking means for releasably locking said cover in sealed relationship with the upper end of said tubular housing.

5. The invention defined in claim 4 wherein said locking means comprises an elongate rigid locking bar mounted at one end for pivotal movement upon said housing about a first horizontal axis located at one side of said housing and extending from said axis laterally across the top of said housing and coupled to said cover at the center of said cover, an elongate rigid locking lever mounted at one end for pivotal movement upon said housing about a second horizontal axis parallel to said first axis and located at the diametrically opposite side of said housing from said first axis, and cam means interengageable between said bar and said lever movable into an over center relationship with at least one of said first second axes to hold said cover in sealed relationship with the upper end of said housing.

6. The invention defined in claim 5 wherein the location of the point of interengagement of said cam means is substantially closer to said second pivot than to the opposite end of said locking lever.

7. The invention defined in claim 1 further comprising a post fixed to and projecting upwardly from said cover at the center of said cover, said vent means comprising a plurality of vent openings symmetrically disposed about said post, an annular shield plate loosely received on said post and overlying said vent openings, and releasable locking means coupled between said housing and said post for releasably locking said cover in sealed relationship with the upper end of said housing.

* * * * *